UNITED STATES PATENT OFFICE.

CARLETON ELLIS, OF MONTCLAIR, NEW JERSEY, ASSIGNOR, BY MESNE ASSIGNMENTS, TO NATIONAL CARBON COMPANY, INC., OF LONG ISLAND CITY, NEW YORK, A CORPORATION OF NEW YORK.

VOID-FILLED DEPOLARIZING MASS.

1,272,406. Specification of Letters Patent. Patented July 16, 1918.

No Drawing. Application filed October 18, 1915. Serial No. 56,447.

*To all whom it may concern:*

Be it known that I, CARLETON ELLIS, a citizen of the United States, and a resident of Montclair, in the county of Essex and State of New Jersey, have invented certain new and useful Improvements in Void-Filled Depolarizing Masses, of which the following is a specification.

This invention relates to depolarizers adapted for use in batteries of the Leclanché type especially dry batteries and the miniature forms of batteries employed for pocket search lights and the like and relates to the use of natural hydrated manganese such as psilomelane and wad and also to the filling of voids in the depolarizing mass to secure the maximum depolarizing effect.

The above mentioned minerals are found in a state of hard dense masses or in the form of a fine powder and may be used with or without purification as depolarizing material. Psilomelane occurs in very hard masses which have to be ground to a powder in order to give a product of satisfactory depolarizing qualities, while wad is usually sufficiently fine to be used direct. If iron or other metals are present which are undesirable they may be removed by extraction with weak acid and the like to purify the material for the purpose in hand.

The natural hydrated manganese dioxids have the advantage of being dense and inexpensive and do not have that bulkiness which is characteristic of artificially prepared manganese dioxid in the hydrated form. These dense hydrated products may be mixed with graphite or other agent to form a depolarizing mass which may be shaped about a carbon electrode and immersed in an exciting fluid of ammonium chlorid in a zinc container. The size of the depolarizing particles and graphite should be chosen so as to substantially fill the voids.

The function of the void filling composition is to enable more depolarizer to be placed in a cell of a given size. The composition is made of particles of various sizes in such proportions that the voids of the coarser particles are filled with the finer particles and the remaining voids are filled with still finer material.

Mixtures of natural and artificial hydrate of manganese dioxid may be used. A proportion of two parts of the former to one part of the later is satisfactory. Such a composition may be prepared which when mixed with graphite will fill the voids to good advantage. An important consideration of depolarizing masses heretofore overlooked is to secure a void-filling composition so that spaces will not be left vacant which should be occupied by depolarizing material. This is secured by the present invention in a satisfactory manner.

This feature coupled with the use of natural hydrated manganese dioxid of a naturally dense character in the preferred form of the invention tends to yield most advantageous results.

What I claim is:—

1. A depolarizer for dry batteries in the form of a molded mass having the voids thereof substantially filled and comprising finely-divided psilomelane.

2. A depolarizer for dry batteries comprising finely-divided psilomelane and graphite, such composition having its voids substantially filled.

3. A depolarizer for dry batteries comprising a molded mass of finely-divided substantially void-filled psilomelane and other manganese depolarizing material.

4. A depolarizer for dry batteries consisting of a substantially void filled mixture of higher oxid of manganese and carbon.

CARLETON ELLIS.